Figure 1:
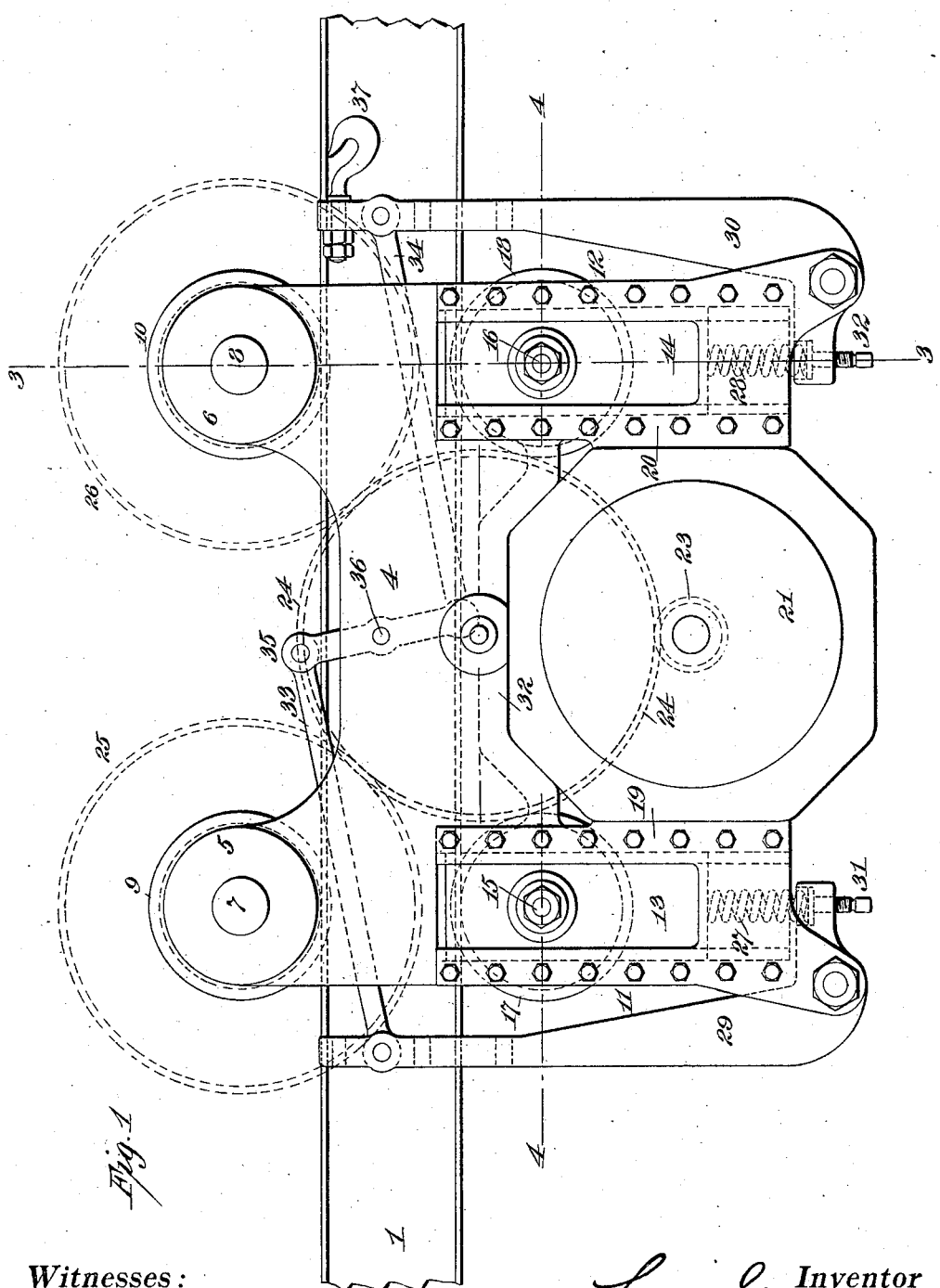

No. 845,405. PATENTED FEB. 26, 1907.
L. GERARD.
TRACTOR FOR ELECTRICAL TOWAGE SYSTEMS.
APPLICATION FILED AUG. 1, 1905.

4 SHEETS—SHEET 1.

Witnesses:
Jas. F. Coleman
John Frisch

Inventor
Léon Gerard
By Dyer & Dyer
Attorneys.

No. 845,405. PATENTED FEB. 26, 1907.
L. GERARD.
TRACTOR FOR ELECTRICAL TOWAGE SYSTEMS.
APPLICATION FILED AUG. 1, 1905.
4 SHEETS—SHEET 2.
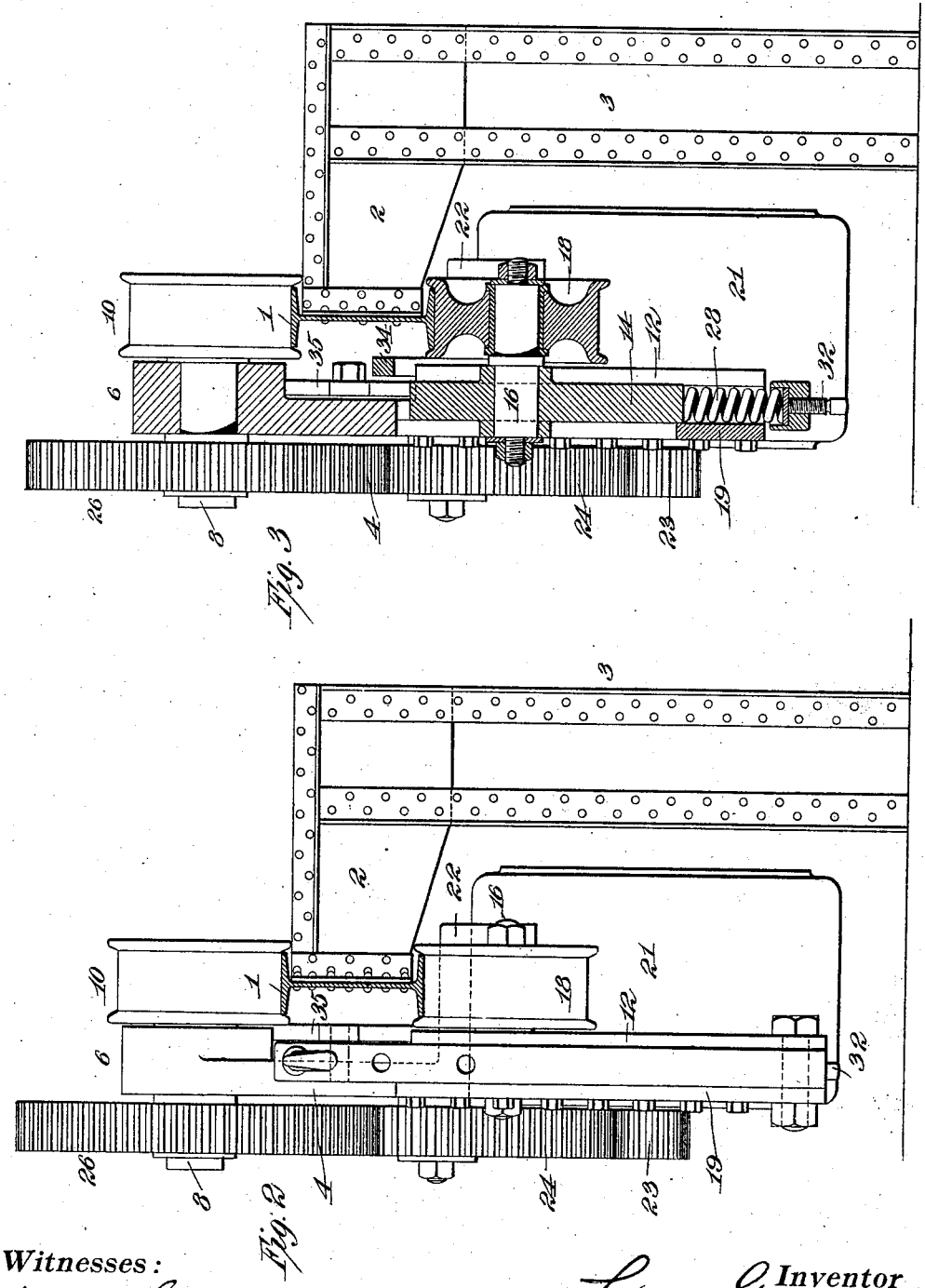
Witnesses:
Inventor
Léon Gérard
By Dyer & Dyer
Attorneys.

No. 845,405. PATENTED FEB. 26, 1907.
L. GERARD.
TRACTOR FOR ELECTRICAL TOWAGE SYSTEMS.
APPLICATION FILED AUG. 1, 1905.

4 SHEETS—SHEET 3.

Witnesses:
Jas. F. Coleman
John Loach

Inventor
Léon Gerard
By Dyer & Dyer
Attorneys.

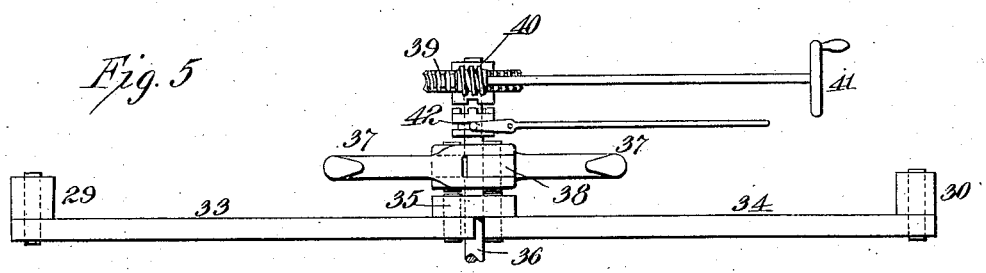
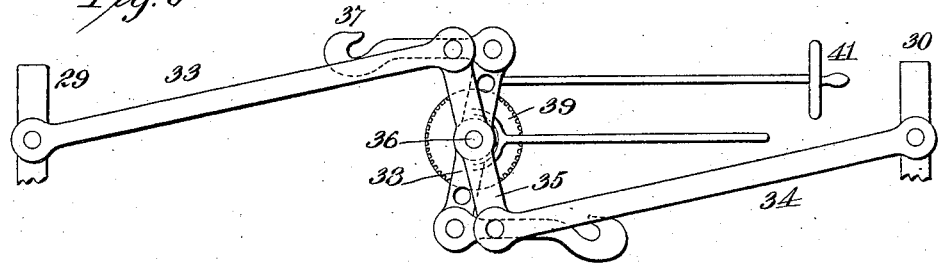
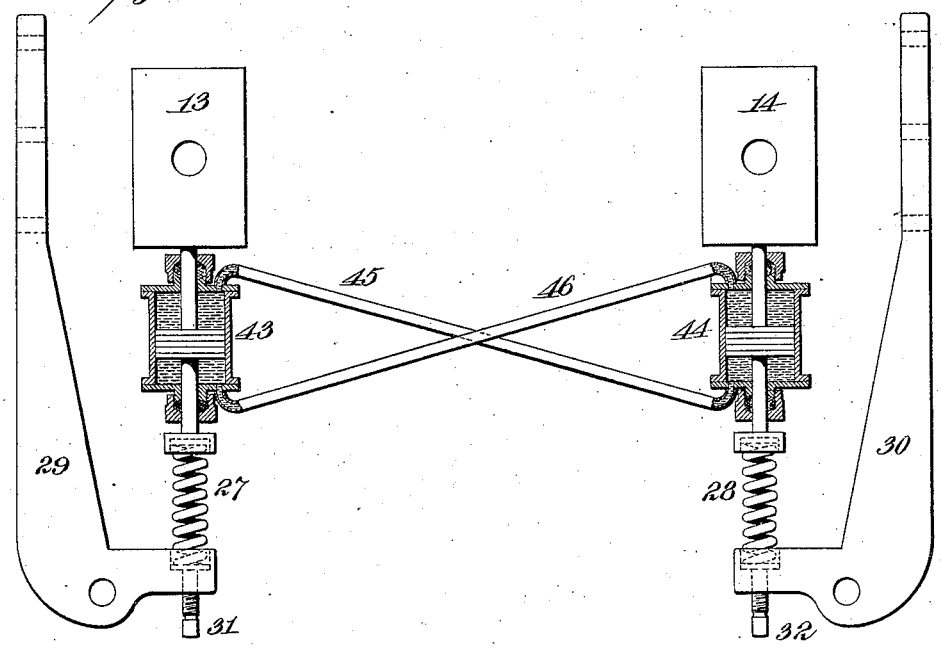

UNITED STATES PATENT OFFICE.

LÉON GERARD, OF BRUSSELS, BELGIUM, ASSIGNOR, BY MESNE ASSIGNMENTS, TO AMERICAN ADHESION TRACTION COMPANY, A CORPORATION OF DELAWARE.

TRACTOR FOR ELECTRICAL TOWAGE SYSTEMS.

No. 845,405.   Specification of Letters Patent.   Patented Feb. 26, 1907.

Application filed August 1, 1905. Serial No. 272,214.

*To all whom it may concern:*

Be it known that I, LÉON GERARD, a subject of the King of Belgium, residing at Brussels, Belgium, have invented a certain new and useful Improvement in Tractors for Electrical Towage Systems, of which the following is a description.

The object I have in view is to produce a tractor for the electrical canal towage system employing an elevated traction-rail upon which the tractor travels, which tractor will be more simple and less expensive in construction and more effective in operation than heretofore and will permit the employment of a lighter and less expensive track structure.

As heretofore constructed tractors for the canal towage system of the character referred to which have been put into operation have been driven by two electric motors connected to traction-wheels and located above the track structure and have been provided with gripping-wheels beneath the center of the tractor. These tractors, having their weight carried above the track structure, have required a heavy track structure to properly support them, and the gripping-wheels being within instead of directly beneath the traction-wheels have resulted in more or less binding of the traction and gripping wheels under the strain of the tow-line. Tractors of this kind, as will be well understood, are provided with trolley-poles extending to an overhead-trolley line for supplying current to the motors and with a suitable platform for the operator, upon which are located the controller and switches by which the tractor may be stopped and started and run in either direction at various speeds.

In my improved tractor the center of gravity is transferred to below the track structure by providing a single electric motor for driving both traction-wheels, which motor is supported on the frame of the tractor below the track structure. The gripping-wheels are placed directly beneath the traction-wheels, being carried by blocks sliding in extensions of the frame hanging downwardly on opposite sides of the motor. These blocks are pressed upwardly to increase the pressure of the gripping-wheels by means of springs adjustable by set-screws, and in order to utilize the strain of the towing-line to increase the upward pressure on the gripping-wheels, and thereby make such pressure proportional to some extent to the load upon the tractor, the springs referred to are carried by pivoted levers, to which the towing-line is directly or indirectly connected in such manner that the towing strain will be distributed equally between the two gripping-wheels.

Figure 4:
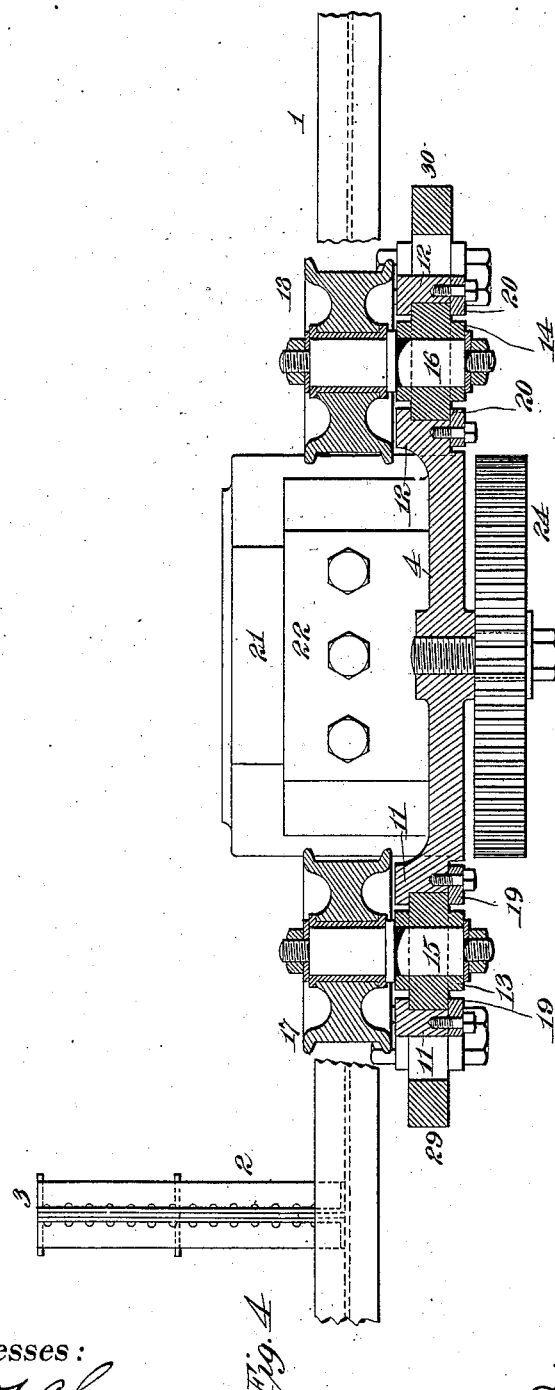

In the accompanying drawings, Figure 1 is a side elevation of a tractor mounted upon a track-beam and illustrating one embodiment of the invention, parts not necessary for the illustration of the invention being omitted and the gears connecting the motor to the traction-wheels being shown in dotted lines. Fig. 2 is an end elevation of a tractor looking to the left in Fig. 1. Fig. 3 is a vertical section on line 3 3 in Fig. 1 looking to the left. Fig. 4 is a horizontal section on line 4 4 in Fig. 1 looking downwardly and showing also in plan a part of the track structure. Figs. 5 and 6 are respectively a top view and side elevation of a modified way of applying the strain of the towing-line equally to both gripping-wheels, and Fig. 7 is a side elevation and partial section of a modified means for equalizing the strain of the towing-line upon the gripping-wheels.

Referring particularly to Figs. 1 to 4, 1 is the track-beam, supported at the end of a bracket 2, carried by a post 3 a sufficient distance above the ground to enable the tractor to clear the ground. The track-beam 1 is an I-beam of ordinary construction. 4 is the body of the frame of the tractor, which when the tractor is mounted upon the track-beam is located opposite the side of the track-beam. This frame has upward extensions forming hubs 5 6, through which pass shafts 7 8, carrying traction-wheels 9 10, which bear on top of the track-beam 1. At its ends the frame 4 has divided downward extensions 11 12, forming ways in which slide blocks 13 14, carrying studs 15 16, upon which are mounted the gripping-wheels 17 18. The blocks 13 14 are held in the ways in the forked extensions 11 12 of the frame by means of face-plates 19 20, which are bolted upon such frame extensions. The gripping-wheels 17 18 are located directly beneath the traction-wheels 9 10 and bear against the under side of the track-beam 1. The electric motor 21 is supported upon the frame 4 between the downward extensions 11 12 and beneath the track structure. This support for the motor may be afforded by a flange 22, extending inwardly beneath the track structure from the frame 4, to which flange the motor is bolted. The motor 21 extends transversely beneath the track structure, so as to bring the center of gravity beneath the track structure and in the same vertical plane as the track structure. The armature-shaft of the motor carries a pinion 23, which meshes with a large gear-wheel 24, carried by a stud from the frame 4, thereby securing the desired speedy reduction, and the wheel 24 in turn meshes with wheels 25 26, which are keyed to the shafts 7 8, carrying the traction-wheels 9 10. The blocks 13 14, which carry the gripping-wheels, are pressed upwardly, so as to secure the desired pressure of the gripping-wheels on the track-beam, by means of springs 27 28, which are carried by the short arms of levers 29 30, pivoted at the lower ends of the downward frame extensions 11 12. Set-screws 31 32, passing through the short arms of the levers 29 30 and bearing upon plates beneath the springs 27 28, are employed to adjust the initial tension of said springs. The long arms of the levers 29 30 are provided with links 33 34, which are connected with a cross-arm 35, carried by a shaft 36. The links 33 34 and cross-arm 35 form an equalizer for distributing the strain of the towing-line between the levers 29 30. 37 is a hook to which the towing-line is attached. This hook is secured to the end of the long arm of either lever 29 or 30, and several holes may be provided in the long arm of each lever, as shown in dotted lines, for carrying separate hooks or for securing the same hook to different points on the arm, so that the leverage of the towing strain upon the gripping-wheels can be varied. When the tractor is running in one direction, as to the left in Fig. 1, the towing-line will be connected with the lever 30, while if the tractor is running in the other direction, as to the right in Fig. 1, the towing-line will be connected with the lever 29. Each lever may be permanently provided with one or more hooks, or the same hook can be transferred from one lever to the other. The proper initial strain being given to the springs 27 28 by means of the set-screws 31 32, the gripping-wheels will increase the traction of the traction-wheels to the desired extent beyond that produced by the weight of the tractor, so as to enable the tractor to run effectively upon the track structure without any load or with a light load. The strain of the towing-line upon the hook 37 will draw the lever 29 or 30, to which it is attached, outwardly, throwing its short arm upwardly and increasing the tension of the spring and the consequent pressure of the gripping-wheel. This outward movement of the lever will be transmitted to the other lever through the equalizer, and the strain of the towing-line will be distributed through the two levers to the two gripping-wheels. Instead of connecting the towing-line to one of the levers 29 30 the towing-line may be connected to an arm extending from the shaft 36 and by turning that shaft will produce an equal thrust upon the levers 29 30 through the links 33 34. Such an arrangement is shown in Figs. 5 and 6, in which an additional cross-arm 38 is secured to the shaft 36, and the draft-hooks 37 are secured either directly or indirectly to the ends of this additional cross-arm. If it is desired to produce this thrust upon the cross-arm by hand, as when the towing-line is connected to a draft-hook attached to the frame of the machine, a worm-wheel 39 may be sleeved upon the shaft 36 and turned by a worm 40 from a hand-wheel 41, a clutch 42 being provided to couple the worm-wheel 39 to the shaft 36.

In Fig. 7 is illustrated an hydraulic equalizer for distributing the towing strain between the levers 29 30. In this arrangement the blocks 13 14, carrying the gripping-wheels, are mounted upon piston-rods carrying pistons movable in cylinders 43 44. These piston-rods are connected, through the springs 27 28, with the short arms of the levers 29 30. The top of the cylinder 43 is connected with the bottom of the cylinder 44 by a pipe 45, while the top of the cylinder 44 is connected with the bottom of the cylinder 43 by a pipe 46. These pipes equalize the pressures in the ends of one cylinder with the opposite ends of the other cylinder. The two cylinders 43 44 and the pipes 45 46 are completely filled with a liquid, such as a suitable oil freed from air, so that the spaces are completely occupied, and the movement of either piston can only take place by a corresponding displacement of the liquid in the other cylinder. The strain of the tow-line will be applied to either one of the levers 29 30, as in the arrangement shown in Fig. 1. The upward movement of one of the pistons caused by the movement of the lever 29 or 30 under the strain of the tow-line will force liquid out of the top and draw liquid into the bottom of the cylinder, and in doing this will produce corresponding changes in the liquid above and below the piston in the other cylinder, thereby moving the other piston to a corresponding extent.

It has heretofore been proposed to connect the towing-line with the gripping-wheels in tractors of this general character, so as to transmit the towing strain to the gripping-wheels; but in such tractors the gripping-wheels have been carried by a single block beneath the center of the tractor, so that a single connection with the tow-line served to exert a pressure upon both gripping-wheels. In my tractor, however, the gripping-wheels being separated and placed at the ends of the frame must be independently mounted, and mechanism must be provided for equalizing or distributing the towing strain between the two gripping-wheels. With respect to this feature of the apparatus my invention relates to a mechanism of the character last referred to.

What I claim is—

1. In a tractor for towage systems, the combination with a supporting-frame, of power-driven traction-wheels located above the track and supporting the weight of the tractor upon the track, an electric motor carried by the frame beneath the track and geared to the traction-wheels, independently-mounted gripping-wheels carried by the frame and bearing against the under side of the track, means for applying the towing strain to said gripping-wheels, and means for equalizing the towing strain between said gripping-wheels, substantially as set forth.

2. In a tractor for towage systems, the combination with a frame depending on one side of the track, of traction-wheels supported by the frame above the track, downward extensions at the ends of the frame, gripping-wheels carried by blocks sliding in such extensions and bearing on the under side of the track, and an electric motor secured to the frame below the track and between the end extensions and geared to the traction-wheels, substantially as set forth.

3. In a tractor for towage systems, the combination with a supporting-frame, of power-driven traction-wheels located above the track and supporting the weight of the tractor upon the track, independently-mounted gripping-wheels supported by the frame and bearing against the under side of the track, separate levers carrying the gripping-wheels on their short arms, and means for applying the towing strain to the long arms of such levers, substantially as set forth.

4. In a tractor for towage systems, the combination with a supporting-frame, of power-driven traction-wheels located above the track and supporting the weight of the tractor upon the track, independently-mounted gripping-wheels supported by the frame and bearing against the under side of the track, separate levers carrying the gripping-wheels on their short arms, means for applying the towing strain to the long arms of such levers, and means for equalizing the towing strain between said levers, substantially as set forth.

5. In a tractor for towage systems, the combination with a supporting-frame, of power-driven traction-wheels located above the track and supporting the weight of the tractor upon the track, independently-mounted gripping-wheels supported by the frame and bearing against the under side of the track, separate levers carrying the gripping-wheels on their short arms, means for applying the towing strain to the long arms of such levers, and a cross connection between the long arms of said levers for moving them in opposite directions and thereby equalizing the towing strain between said levers, substantially as set forth.

6. In a tractor for towage systems, the combination with a supporting-frame depending on one side of the track, of traction-wheels located above the track and supporting the weight of the tractor upon the track, downward extensions at the ends of the frame, gripping-wheels carried by blocks sliding in such extensions and bearing on the under side of the track, an electric motor secured to the frame beneath the track and between the end extensions and geared to the traction-wheels, levers pivoted at the lower ends of such extensions and carrying said gripping-wheels on their short arms, and means for applying the towing strain to the long arms of such levers, substantially as set forth.

7. In a tractor for towage systems, the combination with a supporting-frame depending on one side of the track, of traction-wheels located above the track and supporting the weight of the tractor upon the track, downward extensions at the ends of the frame, gripping-wheels carried by blocks sliding in such extensions and bearing on the under side of the track, an electric motor secured to the frame beneath the track and between the end extensions and geared to the traction-wheels, levers pivoted at the lower ends of such extensions and carrying said gripping-wheels on their short arms, means for applying the towing strain to the long arms of such levers, and means for equalizing the towing strain between said levers, substantially as set forth.

8. In a tractor for towage systems, the combination with a supporting-frame depending on one side of the track, of traction-wheels located above the track and supporting the weight of the tractor upon the track, downward extensions at the ends of the frame, gripping-wheels carried by blocks sliding in such extensions and bearing on the under side of the track, an electric motor secured to the frame beneath the track and between the end extensions and geared to the traction-wheels, levers pivoted at the lower ends of such extensions and carrying said gripping-wheels on their short arms, means for applying the towing strain to the long arms of such levers, and a cross connection between said levers for moving them in opposite directions and thereby equalizing the towing strain between said levers, substantially as set forth.

9. In a tractor for towage systems, the combination with a frame, of traction-wheels above the track, independently-mounted gripping-wheels below the track, springs pressing such gripping-wheels against the track, means for adjusting the initial strain upon such springs, and means for transmitting the towing strain through said springs to the gripping-wheels, substantially as set forth.

10. In a tractor for towage systems, the combination with a frame, of traction-wheels above the track, independently-mounted gripping-wheels below the track, springs pressing such gripping-wheels against the track, means for adjusting the initial strain upon such springs, means for transmitting the towing strain through said springs to the gripping-wheels, and means for distributing or equalizing the towing strain between the gripping-wheels, substantially as set forth.

11. In a tractor for towage systems, the combination with a supporting-frame, of power-driven traction-wheels located above the track and supporting the weight of the tractor upon the track, independently-mounted gripping-wheels supported by the frame and bearing against the under side of the track, springs pressing such wheels against the track, separate levers carrying the gripping-wheels and springs on their short arms, and means for applying the towing strain to the long arms of such levers, substantially as set forth.

12. In a tractor for towage systems, the combination with a supporting-frame, of power-driven traction-wheels located above the track and supporting the weight of the tractor upon the track, independently-mounted gripping-wheels supported by the frame and bearing against the under side of the track, springs pressing such wheels against the track, separate levers carrying the gripping-wheels and springs on their short arms, means for independently adjusting the initial strain upon such springs, and means for applying the towing strain to the long arms of such levers, substantially as set forth.

13. In a tractor for towage systems, the combination with a supporting-frame depending on one side of the track, of traction-wheels located above the track and supporting the weight of the tractor upon the track, downward extensions at the ends of the frame, gripping-wheels carried by blocks sliding in such extensions and bearing on the under side of the track, an electric motor secured to the frame beneath the track and between the end extensions and geared to the traction-wheels, levers pivoted at the lower ends of such extensions, springs located between the short arms of such levers and the blocks carrying the gripping-wheels, and means for applying the towing strain to the long arms of such levers, substantially as set forth.

This specification signed and witnessed this 18th day of July, 1905, at Brussels.

LÉON GERARD.

Witnesses:
MAURICE GERBEAULT,
GREGORY PHELAN.